(12) United States Patent
Campbell et al.

(10) Patent No.: US 11,169,081 B2
(45) Date of Patent: Nov. 9, 2021

(54) SILICONE-MODIFIED CORROSION MONITOR

(71) Applicant: International Business Machines Corporation, Armonk, NY (US)

(72) Inventors: Eric J. Campbell, Rochester, MN (US); Joseph Kuczynski, North Port, FL (US); Sarah K. Czaplewski-Campbell, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/279,644

(22) Filed: Feb. 19, 2019

(65) Prior Publication Data

US 2020/0264093 A1 Aug. 20, 2020

(51) Int. Cl.
*G01N 17/04* (2006.01)
*G01N 17/02* (2006.01)

(52) U.S. Cl.
CPC .............. *G01N 17/04* (2013.01); *G01N 17/02* (2013.01)

(58) Field of Classification Search
CPC .......... G01N 17/02; B22F 9/20; B22F 1/0018
See application file for complete search history.

(56) References Cited

U.S. PATENT DOCUMENTS

| | | | |
|---|---|---|---|
| 6,184,680 B1 * | 2/2001 | Shinoura | B82Y 25/00 324/207.21 |
| 8,629,688 B2 | 1/2014 | Chu et al. | |
| 9,291,543 B1 * | 3/2016 | Robinson | G01N 17/006 |
| 9,423,366 B2 * | 8/2016 | Hamann | G01N 17/04 |
| 2007/0193357 A1 * | 8/2007 | Daaland | G01B 17/02 73/626 |
| 2008/0150556 A1 * | 6/2008 | Han | B82Y 15/00 324/693 |
| 2008/0283418 A1 * | 11/2008 | Jovancicevic | G01N 17/02 205/775.5 |
| 2009/0193872 A1 * | 8/2009 | Tokuda | G01N 27/18 73/23.31 |
| 2011/0108838 A1 * | 5/2011 | Kageyama | H04R 19/016 257/49 |

(Continued)

FOREIGN PATENT DOCUMENTS

WO 2017099948 A1 6/2017

OTHER PUBLICATIONS

Cole et al., "Harsh Environment Impact on Resistor Reliability," SMTA International Conference Proceedings, Oct. 24, 2010, pp. 1-9. http://citeseerx.ist.psu.edu/viewdoc/download?doi=10.1.1.459.7342&rep=rep1&type=pdf.

*Primary Examiner* — Alvaro E Fortich
(74) *Attorney, Agent, or Firm* — Kelsey M. Skodje (57) ABSTRACT

A device, method, and article of manufacture for corrosion monitoring are disclosed. The device includes a corrodible component and a silicone layer positioned over the corrodible component. The method includes providing a corrosion monitoring assembly having a corrodible component and a silicone layer positioned over the corrodible component. The article of manufacture includes a corrosion monitoring assembly having a corrodible component and a silicone layer positioned over the corrodible component.

20 Claims, 3 Drawing Sheets

(56) References Cited

U.S. PATENT DOCUMENTS

| | | | |
|---|---|---|---|
| 2014/0152449 A1* | 6/2014 | Klein | G01N 17/04 |
| | | | 340/662 |
| 2014/0163903 A1* | 6/2014 | Klein | G01N 17/043 |
| | | | 702/32 |
| 2015/0282317 A1* | 10/2015 | Gonya | H05K 3/403 |
| | | | 174/262 |
| 2016/0178549 A1 | 6/2016 | England et al. | |
| 2018/0038785 A1 | 2/2018 | Goergen et al. | |
| 2018/0145038 A1* | 5/2018 | Hirschler | H01L 23/3171 |

* cited by examiner

SILICONE-MODIFIED CORROSION MONITOR

BACKGROUND

The present disclosure relates to corrosion monitoring and, more specifically, to monitoring corrosion caused by gaseous sulfur.

Sulfur is a component of various gases present in industrial environments and geographies with high-sulfur atmospheres. In these gases, sulfur is generally present as a mixture of particulates (e.g., elemental sulfur ($S_8$)) and gaseous sulfur compounds (e.g., sulfur dioxide ($SO_2$), hydrogen sulfide ($H_2S$), and carbon disulfide ($CS_2$)), which are referred to collectively as "gaseous sulfur." Gaseous sulfur is a common cause of corrosion failure in data centers. For example, silver components of electronic devices (e.g., silver electrical contacts, silver plated resistor terminations, and silver traces) react with gaseous sulfur to form silver sulfide ($Ag_2S$), a nonconductive corrosion product. Gaseous sulfur can also contribute to creep corrosion of copper plating on printed circuit boards (PCBs).

SUMMARY

Various embodiments are directed to a corrosion sensor assembly. The corrosion sensor assembly includes a corrodible component and a silicone layer positioned over the corrodible component. The corrosion sensor assembly can also include components such as a printed circuit board (PCB) and a heater. The silicone layer can be a material such as silicone oil, silicone-based thermal interface material (TIM), or room temperature vulcanizing (RTV) silicone. In some embodiments, the silicone layer is less than about 1000 micrometer (μm) thick. Additionally, the corrodible component can be a silver trace or a resistor having silver contacts.

Additional embodiments are directed to a method of corrosion monitoring. The method of corrosion monitoring includes providing a corrosion sensor assembly, which includes a corrodible component and a silicone layer positioned over the corrodible component. The method can also include recording corrosion data values at one or more intervals. In some embodiments, recording the corrosion data values includes measuring electrical resistance or electrical capacitance of the corrodible component. Providing the corrosion sensor assembly can include applying the silicone layer. The corrosion sensor assembly can also include a heater, the temperature of which can be raised and lowered at one or more temperature cycling intervals. The method can also include connecting the corrosion sensor assembly to a PCB. Additionally, the method can include predicting a time to failure of a device based on the recorded corrosion data values. The device can include at least one electrical component having a corrodible material and at least one silicone material.

Further embodiments are directed to an article of manufacture. The article of manufacture includes a corrosion sensor assembly, which includes a corrodible component and a silicone layer positioned over the corrodible component. The corrosion sensor assembly can be connected to a PCB. Additionally, the article of manufacture can include one or more electronic components. One or more of the electronic components can include a corrodible material and at least one silicone material. In some embodiments, at least one of the electronic components is a resistor.

DETAILED DESCRIPTION

Corrosion caused by sulfur compounds reacting with metal components of electronic devices is a common cause of device failure in data centers and other environments containing electronics. These sulfur compounds are present to varying degrees in these environments as gas-phase molecules and particulates, which are referred to collectively as "gaseous sulfur." Components of gaseous sulfur can include gas-phase molecules such as sulfur dioxide ($SO_2$), hydrogen sulfide ($H_2S$), and carbon disulfide ($CS_2$), as well as sulfur aerosols with components such as ammonium sulfate ($(NH_4)_2SO_4$), sulfuric acid ($H_2SO_4$), and elemental sulfur ($S_8$). Corrodible metal components of electronic devices, such as silver traces and silver electrical contacts, react with these gaseous sulfur components to form nonconductive corrosion products such as silver sulfide ($Ag_2S$). The formation of these corrosion products leads to device failure over time.

However, the corrosion damage to electronic devices caused by gaseous sulfur and other corrosive atmospheric materials (e.g., ozone, ammonium salts, nitric acid, dust, chlorine, etc.) can usually be reduced or prevented. The extent of sulfur corrosion damage is largely dependent on environmental factors such as air quality, airflow, temperature, humidity, and device construction. Monitoring and controlling these factors can slow sulfur corrosion. Mitigation techniques can include using alternate device constructions and/or materials, using air purification and filtration systems, controlling temperature and humidity, and applying inert, gas-impervious barriers to devices or device components. For example, electronic components can be protected from many types of chemical corrosion by applying coatings (e.g., adhesives, potting compounds, and conformational coatings) that contain silicone polymers. However, coatings containing silicone polymers offer little protection from sulfur corrosion. In fact, silicone polymers have been found to increase the rate of sulfur corrosion.

Corrosion sensors can be used to determine when and how to take actions to slow or prevent corrosion. Corrosion sensors include a sample of at least one corrodible metal, which can also be a component of hardware in the same environment. These corrodible metals are most commonly silver or copper, but other corrodible metals can also be monitored (e.g., nickel, cobalt, permalloy, zinc molybdenum, titanium, tungsten, and alloys or laminates thereof). The corrosion rate of the metal in an environment that potentially includes gaseous sulfur is determined, providing an air-quality measurement and allowing predictions to be made about the lifetime of device hardware within the environment.

However, existing corrosion sensors require improvements in accuracy, reliability, size, and cost. For example, hardware failure attributable to sulfur corrosion is commonly detected in data centers even when measured silver corrosion rates are considered acceptable (e.g., less than 300 ångströms (Å) per month). This is often caused by the presence of silicone coatings, which can exacerbate corrosion in the presence of gaseous sulfur. Other sources of silicone that can contact corrodible materials can include adhesives, sealants, sealant/adhesives, electrical insulating gels, and thermal interface materials (TIMs). Because existing corrosion sensors do not account for the effects of silicone materials in contact with silver components, these sensors cannot determine accurate rate calculations or time to failure predictions. This leads to irreversible sulfur corrosion damage that could have been prevented by earlier actions.

Disclosed herein are corrosion sensors that account for the effects of silicone (e.g., silicone polymers) on sulfur corrosion. These real-time corrosion sensors include a corrodible metal (e.g., silver) in contact with silicone. Corrosion of the metal in contact with the silicone is monitored. A rate of corrosion calculated from the monitoring data can be used to predict when components of electronic devices in the monitored environment are likely to fail due to sulfur corrosion. Actions can then be taken to reduce the amount of gaseous sulfur (e.g., by employing air filtration techniques) and/or obtain replacement components.

Figure 1:
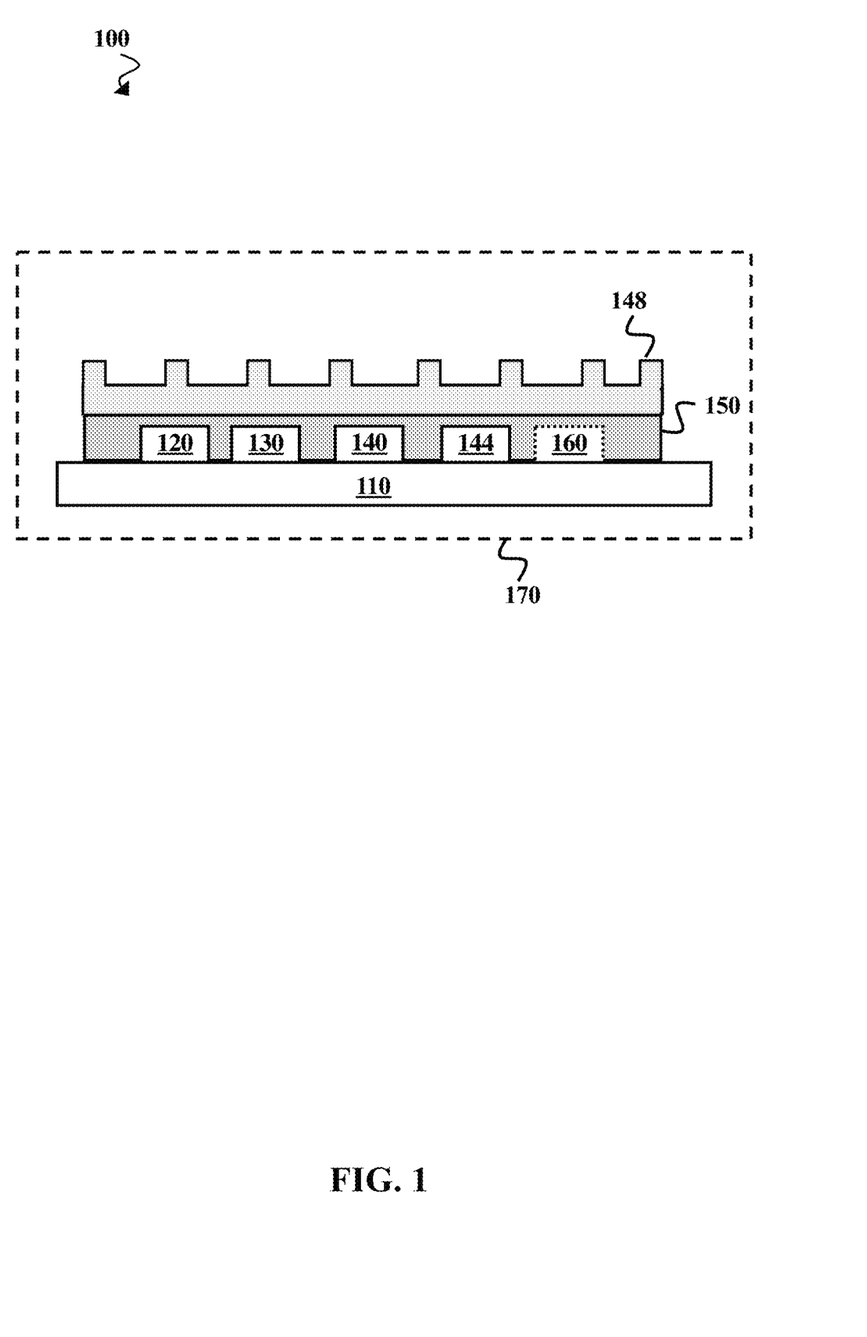
FIG. 1 is a block diagram illustrating a corrosion sensor assembly, according to some embodiments of the present disclosure.

FIG. 1 is a block diagram illustrating a corrosion sensor assembly 100, according to some embodiments of the present disclosure. The corrosion sensor assembly 100, which is also referred to herein as "sensor assembly 100" or "assembly 100," includes a printed circuit board (PCB) 110 mechanically supporting and electrically connecting electronic components (e.g., resistors, capacitors, transistors, diodes, integrated circuit chips, etc.). Electronic components connected to the PCB 110 include a test controller 120, at least one corrodible component 130, and optional temperature control components, which include a temperature sensor 140, a heater 144, and a heat sink 148. A silicone layer 150 is positioned over the corrosion sensor assembly 100. In some embodiments, the corrosion sensor assembly 100 includes additional electronic components 160 and/or a housing 170.

The PCB 110 can be any type of PCB known in the art. For example, the PCB 110 can be single-sided, double-sided, or multi-layered. The PCB 110 substrate can be made from any conventional substrate materials (e.g., copper foil with a glass fiber-reinforced epoxy resin or a paper-reinforced phenolic resin). In some embodiments, electronic components are electrically and/or mechanically connected to the PCB 110 using surface-mount technology. However, through-hole components and pluggable connectors (e.g., secure digital (SD) memory card connectors) can also be used.

The test controller 120 is a microcontroller configured to direct corrosion monitoring operations. These operations can include identifying data logging intervals, obtaining data (e.g., recording temperatures determined by the temperature sensor 140, making time interval measurements, collecting and recording electrical measurements, etc.), carrying out data analysis, and communicating results of the data analysis. The test controller 120 can also communicate the data to another device for analysis and/or display. In some embodiments, the operations also include a thermal cycling process in which the test controller 120 changes temperature set points for the temperature control components according to a test schedule, causing the heater 144 to raise and lower its temperature at specified intervals. Test controller 120 operations are discussed in greater detail with respect to FIG. 3.

The silicone layer 150 is positioned over (e.g., covering and optionally in contact with) components of the corrosion sensor assembly 100, including the corrodible component 130 and/or the heater 144. When the silicone layer 150 is a silicone-based TIM (e.g., a thermally conductive pad), a load is applied on the silicone layer by the heat sink 148. This is because the TIM silicone layer 150 is positioned between the sensor assembly 100 and fasteners (not shown) for securing the heat sink 148 to the assembly 100. The mechanical force from the heat sink 148 can increase the amount of silicone leaching from the silicone layer 150. Examples of fasteners that can be used to connect the heat sink 148 include spring-loaded screws and spring-action clamps, though any appropriate fastener can be used (e.g., threaded fasteners). In some embodiments, the heat sink 148 can be fastened by a thermal adhesive silicone layer 150.

In FIG. 1, the silicone layer 150 is illustrated as covering every component mounted on the PCB 110 except for the heat sink 148. However, in some embodiments fewer components are covered by the silicone layer 150. For example, the silicone layer 150 can cover only the corrodible component 130 or only the heater 144. In instances where multiple corrodible components 130 are mounted on the PCB 110, the silicone layer 150 can be positioned so that some of the corrodible components 130 are covered by the layer 150 and some are not. Corrosion data can then be collected both with and without the effects of a silicone material in contact with the corrodible component 130.

The silicone layer 150 can be a silicone-based thermal interface material (TIM), such as a silicone-based thermal film, thermal grease (e.g., a non-curing silicone polymeric matrix containing conductive filler particle), thermally conductive pad, thermally conductive adhesive, polymer-solder hybrid, polymer-metal composite, etc. In some embodiments, the silicone layer 150 is a silicone-based phase change material or a silicone rubber, such as room temperature vulcanizing silicone rubber (RTV silicone). However, any silicone-based TIMs known to a person of ordinary skill in the art can be used (e.g., a siliconized hybrid resin (e.g., a urethane-silicone resin or an epoxy-silicone resin), polyimide/silicone rubber laminates, mica insulators with silicone grease). In some embodiments, the silicone layer 150 is not thermally conductive. Examples of non-thermally conductive silicone layers 150 can include silicone-based sealants, sealant/adhesives, electrical insulating gels, or conformal coatings. Further, the silicone layer can be a silicone oil, such as polydimethylsiloxane (PDMS) and silicone-polyether copolymers. The silicone layer 150 can be substantially the same as the type of silicone material used in a system monitored by the sensor assembly 100. However, different silicone materials are used in other embodiments.

The corrodible component 130 can be a silver trace or silver electrical contacts for a resistor, such as a surface-mount thick film resistor. However, the corrodible component 130 can also be a component such as silver-plated resistor terminations, a set of interdigitated silver electrodes or opposing silver electrodes separated by an air gap. While the corrodible component 130 is represented by a single rectangle in FIG. 1, more than one corrodible component 130 is included in some embodiments. For example, assembly 100 can include at least one silver trace and at least one resistor with silver contacts. In some embodiments, at least one corrodible component 130 includes a corrodible metal other than silver. Examples of these corrodible metals can include copper, aluminum, or any other corrodible metal (e.g., nickel, cobalt, permalloy, zinc molybdenum, titanium, tungsten, and alloys or laminates thereof). The metal can be selected based on its susceptibility to sulfur corrosion and its potential contact with silicone polymers.

The temperature control components include the temperature sensor 140, the heater 144, and the heat sink 148. In some embodiments, the heater 144 is a thermoelectric heat pump, though any type of heater appropriate for use with PCBs can be used. Examples of heat sink 148 materials can include aluminum alloys (e.g., 1050A aluminum alloy, 6060 aluminum alloy, 6063 aluminum alloy, etc.), copper, diamond, and composite materials (e.g., aluminum matrix-silicon carbide (AlSiC) or silver-copper alloy matrix-diamond composites). In some embodiments, at least one of the temperature control components 140, 144, and 148 is not included in the corrosion sensor assembly 100. For example, the assembly 100 can include the temperature sensor 140 without the heater 144 and heat sink 148. In these instances, the sensor assembly 100 operates at the temperature of its surroundings.

The corrosion sensor assembly 100 can optionally include one or more additional components 160. These components 160 are represented by a single rectangle in FIG. 1. However, the number of additional components 160 depends upon the size of the PCB 110; the size of the components 120, 130, 140, 144, 148, 150 and 160; and the desired functionalities. Examples of additional components 160 can include environmental sensors (e.g., humidity, shock, and/or vibration sensors), non-corrodible reference sensors (e.g., gold traces or gold electrodes), additional corrosion sensors for gaseous sulfur or other corrosive/reactive compounds, sensors for non-corrosive gases, microprocessors, flash memory components, a battery and/or connection to an external power supply, capacitors, resistors, inductors, memristors, semiconductors, diodes, transistors, integrated circuits, and transducers.

The corrosion sensor assembly 100 can be at least partially enclosed in a housing 170 that provides protection from physical damage without preventing atmospheric gases from contacting the corrodible component 130. Apertures (e.g., slots and/or holes) in the PCB 110 and/or housing allow air flow through and around the corrodible component 130. Examples of enclosure materials that can be used include steel, aluminum, and plastics (e.g., acrylic, acrylonitrile butadiene styrene, acetal, etc.). However, in some embodiments the assembly 100 is not enclosed in a housing.

There can also be a component mounted on the housing 170 or the PCB 110 for communicating corrosion levels and/or other information (e.g., temperature, time, a user interface for adjusting device settings). This display component is not illustrated herein. However, examples of display components can include any type of text, and/or graphical image display (e.g., a liquid crystal display (LCD), light-emitting diode (LED), or gas plasma panel). Other examples of display components can include audible alerts (e.g., a beeping or buzzing) or lights that turn on, turn off, or change color in response to corrosion data. In other embodiments, information from the sensor is displayed on an external device, which receives the information from the testing component 120.

The corrosion sensor assembly 100 can be included in a standalone sensor device for monitoring an area containing one or more electronic devices (e.g., servers or desktop computers). These areas can include commercial data centers, laboratories, semiconductor clean rooms, electronic fabrication sites, archival storage facilities, etc. The corrosion sensor assembly 100 can also be positioned proximate to or in the interior of another electronic device or electrically connected to a device PCB. This is discussed in greater detail with respect to FIG. 2.

Figure 2:
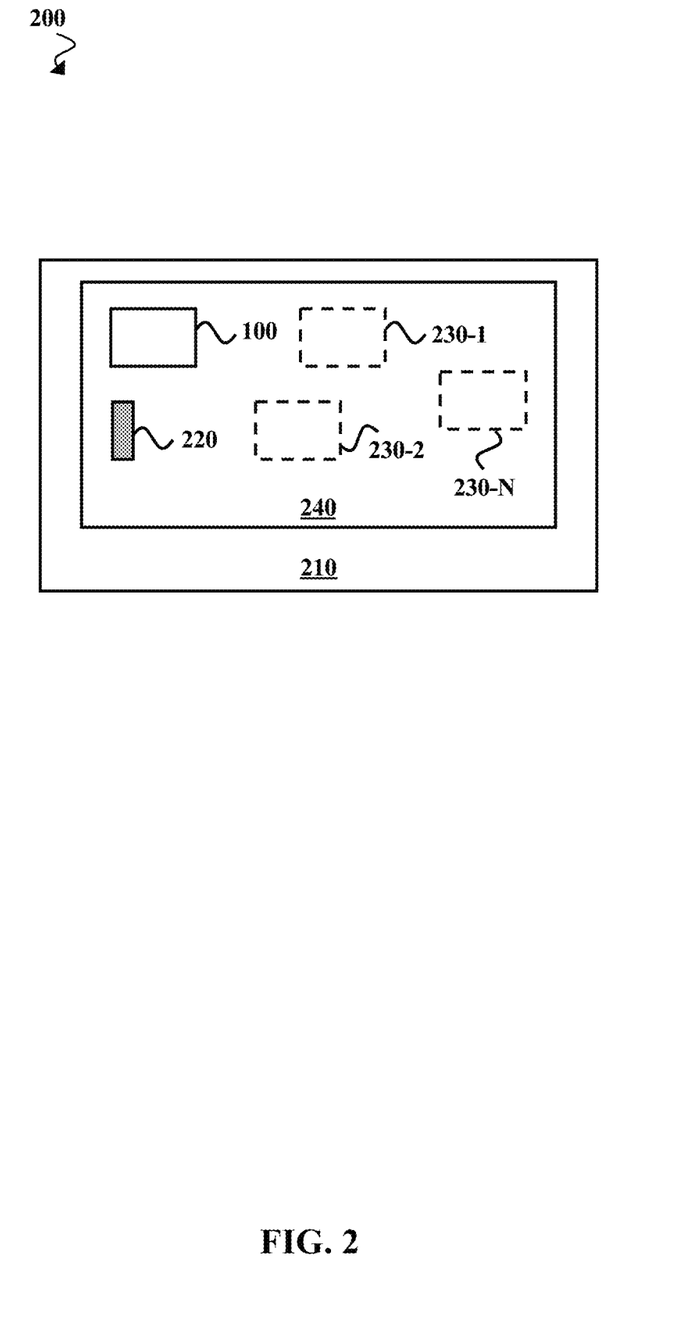
FIG. 2 is a block diagram illustrating a corrosion monitoring environment, according to some embodiments of the present disclosure.

FIG. 2 is a block diagram illustrating a corrosion monitoring environment 200, according to some embodiments of the present disclosure. The corrosion monitoring environment 200 is a data center or another location containing at least one electronic device 210 susceptible to sulfur corrosion. Examples of devices such as these can include servers, desktop or laptop computers, mobile computing devices, and scientific instruments. The electronic device 210 includes at least one electronic component 220 that includes a corrodible material (referred to herein as a "corrodible device component 220") and at least one corrosion sensor assembly 100, which is illustrated in FIG. 1. In addition to the corrosion sensor assembly 100 and corrodible device component 220, one or more additional components 230-1, 230-2, and 230-N (referred to collectively as "additional components 230") can also be included.

The sensor assembly 100 and other device components 220 and 230 are mounted on a substrate 240 within the device 210. In the example illustrated in FIG. 2, the illustrated substrate 240 is a PCB, and also referred to herein as "PCB substrate 240." However, any appropriate substrate can be used in other embodiments, such as the interior or exterior surface of a housing enclosing the device 210. The corrosion sensor assembly 100 and device components 220 and 230 can be connected to the PCB substrate 240 using surface-mount or through-hole technology. Additionally, the corrosion sensor assembly 100 can be mechanically and/or electrically connected to the PCB substrate 240 by a pluggable connector (not shown), such as a board-to-board connector or a microSD connector. Pluggable connectors allow users to easily install, remove, and/or replace the corrosion sensor assembly 100.

Examples of the corrodible device component 220 mounted on the PCB substrate 240 can include silver or other corrodible metal components of resistors, capacitors, connectors, integrated circuits, or signal traces. Multiple corrodible device components 220 are included in some embodiments. Examples of additional device components 230 mounted on the PCB substrate 240 can include microcontrollers, power supplies, memory components, and/or environmental sensors (e.g., humidity sensors, shock sensors, vibration sensors, and/or temperature sensors). It should be noted that the device 210 can include multiple PCBs or other substrates on which are mounted additional electronic components and/or additional corrosion sensor assemblies 100.

The sensor assembly 100 can optionally be positioned on the substrate 240 as part of a gas sensor array (not shown), such as an array having a total number of sensors between 2-4 sensors, 2-16 sensors, or 2-50 sensors. In addition to the illustrated sensor assembly 100, the sensor array can include sensors for gases other than gaseous sulfur. Examples of gas sensors in an array such as this can include sensors for gases such as carbon monoxide (CO), nitrogen oxides ($NO_x$), gaseous ammonia ($NH_3$), and/or volatile organic compounds (VOCs) such as hydrocarbons, formaldehyde, chlorofluorocarbons and chlorocarbons, benzene, methylene chloride, perchloroethylene, methyl tert-butyl ether, etc.

Figure 3:
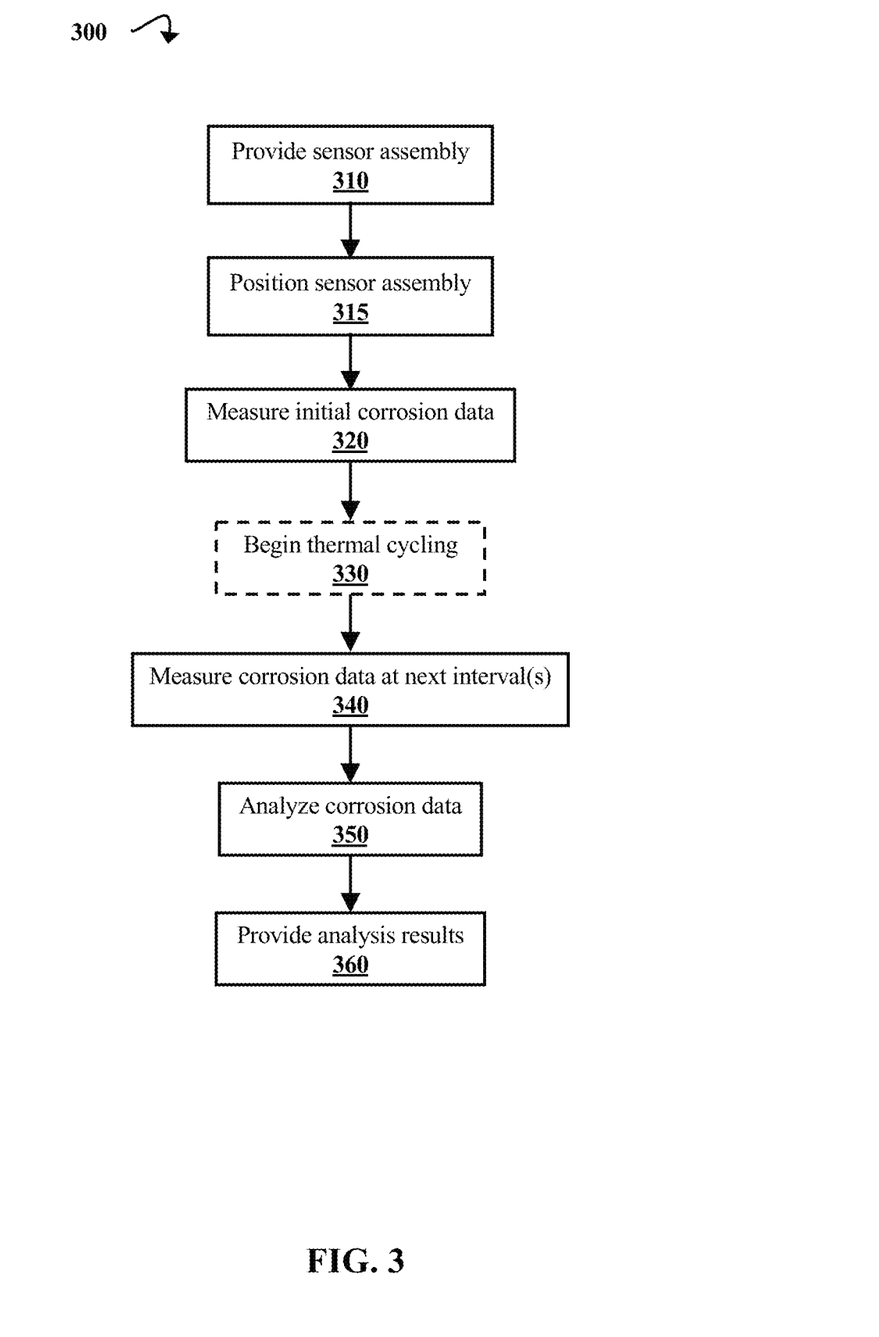
FIG. 3 is a flow diagram illustrating a process of monitoring gaseous sulfur corrosion, according to some embodiments of the present disclosure.

FIG. 3 is a flow diagram illustrating a process 300 of monitoring gaseous sulfur corrosion, according to some embodiments of the present disclosure. To illustrate process 300, but not to limit embodiments, FIG. 3 is described within the context of the corrosion sensor assembly 100 of FIG. 1 and corrosion monitoring environment 200 of FIG. 2.

Where elements described with respect to FIG. 3 are identical to elements shown in FIGS. 1 and 2, the same reference numbers are used in both Figures. However, it will be appreciated that various alternative equipment arrangements can be used to perform process 300.

In process 300, a corrosion sensor assembly 100 is provided. This is illustrated at step 310. The corrosion sensor assembly 100 can be fabricated using conventional fabrication techniques, such as microfabrication or semiconductor fabrication methods, or obtained from commercial sources. Examples of microfabrication techniques that can be used can include casting, injection molding, embossing, ablation, compression molding, thin-film deposition, and/or Computer Numerical Control (CNC) micromachining. Additional examples of fabrication methods that can be used can include photolithography and/or etching (e.g., wet chemical etching, inductively coupled plasma deep silicon etching, laser ablation, air abrasion, reactive ion etching, etc.).

The silicone layer 150 is applied by conventional silicone application techniques. For example, the silicone layer 150 can be applied by brush, spatula, liquid droplet dispenser, syringe, metering fluid dispenser, roller, or tube with nozzle. The method of application can be selected based on the type of silicone material (e.g., silicone oil, silicone-based thermal interface material, or RTV silicone), size of the assembly 100, and/or other factors, such as the desired thickness of the layer 150. The thickness of the silicone layer 150 can range from about 25 µm-250 µm. However, any appropriate thickness can be applied (e.g., a thickness between about 25 µm-100 µm, 100 µm-250 µm, 250 µm-400 µm, etc.). In some embodiments, the silicone layer 150 has a thickness of up to about 1000 µm.

Corrodible components 130 can be mounted on the PCB 110 substrate by surface mount or through-hole techniques. Additionally, corrodible components 130 such as silver traces can be applied using techniques such as physical vapor deposition (PVD), film application, or rolling application. In some embodiments, the corrodible material of a corrodible component 130 has a thickness of about 500 Å, about 1000 Å, or about 1500 Å, though any appropriate thickness can be used (e.g., within a range of about 100 Å-2000 Å). Thicker corrodible materials can extend the lifetime of the sensor assembly 100 by providing more material (e.g., silver) to react with gaseous sulfur.

The corrosion sensor assembly 100 is positioned in a location that is to be monitored for potential corrosion. This is illustrated at step 315. The corrosion sensor assembly 100 is connected to a PCB substrate 240, package, or other platform for use as a sensor. Platforms are discussed in greater detail with respect to FIG. 2. The assembly 100 can also be partially enclosed in a housing 170 as a standalone sensor device. In some embodiments, the sensor assembly 100 is positioned by a user (e.g., by plugging into a connector mounted on the PCB substrate 240). However, sensor assemblies 100 can also be preinstalled in electronic devices by the manufacturer. The preinstalled assemblies 100 are removable in some embodiments. This allows users to replace sensors that no longer function effectively.

An initial corrosion data measurement is collected from the corrodible component 130. This is illustrated at step 320. This measurement establishes baseline corrosion data to which subsequent corrosion measurements are compared. The initial measurement can be made when directed to by the test controller 120 based on preset instructions or instructions input by a user. The test controller 120 can add the initial corrosion data to a flash memory component and/or communicate the data to an external device.

Any type of appropriate data for monitoring corrosion can be collected, such as the electrical resistance, electrical capacitance, mass, or thickness of the corrodible component 130. For example, if the corrodible component 130 is a resistor-capacitor (RC) circuit, its capacitance can be determined at step 320 by determining the time it takes to charge the RC circuit. In examples where resistance is measured, the resistance of the corrodible component 130 can be determined using a voltmeter, ammeter, ohmmeter, or combination thereof.

It should be noted that, although step 320 is illustrated as occurring after positioning the assembly 100 in an environment to be monitored at step 315, the initial measurement can be made before the sensor assembly 100 is positioned. For example, the measurement can be made by the manufacturer.

A process of thermal cycling can optionally be carried out during the corrosion monitoring of subsequent steps. This is illustrated at step 330. The thermal cycling process approximately mimics the temperature changes experienced by corrodible components of electronic devices in the monitored area. Temperature increases can cause leaching of silicone oil from silicone coatings and/or TIMs. This allows the silicone oil to migrate to the surface of corrodible components (e.g., silver contacts and traces) in the electronic devices. In the presence of gaseous sulfur, the silicone oil on the surface of the corrodible components absorbs corrosive sulfur compounds, thereby facilitating corrosion of the corrodible material.

In order to produce thermal conditions similar to those experienced by the monitored electrical devices, the test controller 120 directs the heater 144 to raise and lower the temperature of the sensor assembly 100 to a selected temperature at regular intervals (e.g., intervals of about one hour, several hours, about one day, etc.) as corrosion data measurements are taken. The temperature and intervals can be selected based on their similarity to those experienced by the electronic devices being monitored. When the silicone layer 150 is a solid or semisolid, a sufficient increase in temperature (e.g., from ambient temperature to about 30° C.-200° C.) causes silicone oil to leach from the solid material of the silicone layer 150 and migrate into crevices of the corrodible component 130. Therefore, the temperature of the assembly 100 can be raised to a temperature at which silicone is may leach into surrounding materials/compositions.

The intervals and degrees of temperature changes are directed by the test controller 120 according to settings entered by the manufacturer and optionally adjusted by the user. At step 330, the heater 144 can raise and lower the temperature by a preset number of degrees at each interval or to preset maximum and minimum temperatures. The degree of temperature change to reach the preset temperatures is directed by the test controller 120 according to temperature measurements collected by the temperature sensor 140.

In some embodiments, thermal cycling at step 330 is omitted. In these instances, the corrosion sensor assembly 100 can operate at the temperature of its surroundings or at a constant temperature maintained by the temperature sensor 140 and heater 144. For example, the assembly 100 can be mounted on a PCB in a device that is to be monitored by the assembly 100 (e.g., PCB substrate 240 in electronic device 210, illustrated in FIG. 2). Because the sensor assembly 100 is mounted near corrodible components of the monitored device, the device components and the sensor assembly 100 can experience substantially the same temperature changes.

Therefore, similar quantities of silicone oil can leach from the silicone layer 150 of the sensor assembly 100 and the other silicone materials in the electronic device. In another example where the thermal cycling is omitted from process 300, the silicone layer 150 a silicone oil. Therefore, silicone migration and contact with the corrodible component 130 can occur without the silicone oil leaching caused by a temperature increase.

Corrosion data is collected at one or more intervals after the initial measurement. This is illustrated at step 340. The measurements are recorded by the test controller 120, which can also record the time at which each measurement is made. The measurement intervals are directed by the test controller 120 and can be any appropriate length of time (e.g., less than one second, approximately 1 sec-60 sec, approximately 1 min-1 hour, approximately 1 hour-1 day, more than one day, etc.). The measurements can be recorded and stored in substantially the same manner as the initial corrosion data measurement at step 320. For example, if the initial measurement is collected by determining the time it takes to charge an RC circuit corrodible component 130, the time to charge the RC circuit corrodible component 130 is again measured at each interval of step 340.

The collected corrosion data is analyzed. This is illustrated at step 350. The corrosion data collected at steps 320 and 340 is analyzed by the test controller 120, an external device, or another microprocessor mounted on the PCB 110 or PCB substrate 240. The analysis can take place at any point in process 300, such as during steps 340 and optionally 330, as well as after the monitoring process 300 has concluded. A predicted time to device 210 and/or sensor assembly 100 failure can be calculated based on the analysis.

Analysis of the corrosion data provides at least one measure of corrosion, which is referred to herein as a "corrosion data value." Corrosion data values can be rates of corrosion calculated from measurements (e.g., measurements of resistance, capacitance, thickness, mass, etc.) taken over a given period of time and number of intervals. The corrosion rates can be used to predict future corrosion levels under similar environmental conditions or other hypothetical environmental conditions. The corrosion data values can also indicate the extent of corrosion that has already occurred. For example, a corrosion data value can be the percentage of corrodible material converted to non-conductive corrosion products at the time of measurement.

The data analysis can also include determining when a measured or predicted corrosion data value is greater than a threshold value. In some embodiments, the threshold value corresponds to a test failure value (e.g., a corrosion data value previously found to correspond to device failure during testing) or industry standard value for corrosion levels experienced by devices. However, other threshold values can be used. For example, there can be thresholds below test failure values and industry standard values, which when reached can indicate that action should be taken to reduce gaseous sulfur levels or replace device components. These thresholds can be preset thresholds, but threshold corrosion data values can also be selected or entered by a user in some embodiments.

The results of the analysis are provided to users. This is illustrated at step 360. These results can be communicated through text and/or graphical images on a display screen that is part of the corrosion sensor assembly 100, the electronic device 210, or another device (e.g., a mobile computing device or a desktop computer). Display screens are discussed in greater detail with respect to FIG. 1. When the results are provided, the user can take actions that will prevent further damage or device failure, such as improving air quality and/or replacing, isolating, repairing, or turning off devices that are near failure. In some embodiments, these actions can be automated.

The analysis results can be communicated as a report to be viewed by a user at any time. For example, the report can include measured and predicted corrosion data values, as well as predicted times to device damage or failure. The report can also provide information such as the level of gaseous sulfur in the environment, suggestions for improving air quality or replacing components, and various additional information (e.g., time, temperature, humidity, number of corrosion measurement completed, predicted lifetime of the sensor assembly 100, levels of gases other than gaseous sulfur, etc.). This data can be displayed in a form such as a graph, table, graphical image, textual description, etc. In some embodiments, a user can select which information to display via a user interface.

Additionally, one or more alerts can be generated when a measured corrosion data value or a threshold number of measured corrosion data values are greater than a threshold value. Alerts can also be generated when device damage or failure is predicted to occur in the near future (e.g., a day, a week, a month, etc.). In some embodiments, an alert is a message displayed on an electronic device having a display screen, such as a computer monitor, a mobile device screen, or any digital display. The alerts can be displayed as text, icons, images, colors, etc. However, alerts can also be lights (e.g., an LED panel) or sounds (e.g., a beep, ding, buzz, recorded voice, or computer-generated voice).

The examples discussed herein and represented in the accompanying drawings may make reference to particular details. However, it should be understood that there are various modifications that can be made while retaining the spirit and scope of the disclosure. These would be easily recognized and carried out by one of ordinary skill in the art.

The diagrams illustrated in FIGS. 1 and 2 are for ease of description only, and are not to scale. Any appropriate size, shape, or arrangement of components known in the art can be used. Additionally, spatially relative terms used herein (e.g., "above," "below," "over," "under," etc.) are used to provide relative relationships between structures, and are intended to encompass various orientations of the assemblies. The use of these terms does not require a particular structure to be located in a particular location. Ranges (e.g., time, concentration, temperature, etc.) indicated herein include both endpoints and all numbers between the endpoints. Unless specified otherwise, the use of "about" or "approximately" in connection to a range applies to both ends of the range (e.g., "approximately 1 g-5 g" should be interpreted as "approximately 1 g-approximately 5 g"). As used herein, modifying terms such as "about" or "approximately" indicate+/−10% of a recited value, range of values, or endpoints of one or more ranges of values.

What is claimed is:

1. A corrosion sensor assembly, comprising:
   a corrodible component;
   a silicone layer positioned in contact with the corrodible component; and
   a test controller configured to monitor a corrosion rate of the corrodible component in contact with the silicone layer.

2. The corrosion sensor assembly of claim 1, further comprising a printed circuit board (PCB).

3. The corrosion sensor assembly of claim 1, wherein the silicone layer comprises a silicone-based thermal interface material.

4. The corrosion sensor assembly of claim 1, wherein the silicone layer comprises silicone oil.

5. The corrosion sensor assembly of claim 1, further comprising a heater.

6. The corrosion sensor assembly of claim 1, wherein the corrodible component comprises a silver trace.

7. The corrosion sensor assembly of claim 1, wherein the corrodible component comprises silver electrical contacts.

8. The corrosion sensor assembly of claim 1, wherein the silicone layer is less than about 1000 micrometers (μm) thick.

9. A method of corrosion monitoring, comprising:
provided a corrosion sensor assembly, the corrosion sensor assembly comprising:
  a corrodible component;
  a silicone layer positioned in contact with the corrodible component; and
  a test controller configured to monitor a corrosion rate of the corrodible component in contact with the silicone layer.

10. The method of claim 9, further comprising recording corrosion data values at one or more intervals.

11. The method of claim 10, wherein the recording the corrosion data values comprises measuring electrical resistance of the corrodible component.

12. The method of claim 10, wherein the recording the corrosion data values comprises measuring electrical capacitance of the corrodible component.

13. The method of claim 9, wherein the corrosion sensor assembly further comprises a heater, and wherein the temperature of the heater is raised and lowered at one or more temperature cycling intervals.

14. The method of claim 9, wherein the providing the corrosion sensor assembly comprises applying the silicone layer.

15. The method of claim 9, further comprising connecting the corrosion sensor assembly to a printed circuit board (PCB).

16. The method of claim 9, further comprising predicting a time to failure of a device based on recorded corrosion data values, the device comprising:
at least one electrical component that includes a corrodible material; and
at least one silicone material.

17. An article of manufacture, comprising:
a corrosion sensor assembly, the corrosion sensor assembly comprising:
  a corrodible component;
  a silicone layer positioned in contact with the corrodible component; and
  a test controller configured to monitor a corrosion rate of the corrodible component in contact with the silicone layer.

18. The article of manufacture of claim 17, wherein the corrosion sensor assembly is connected to a printed circuit board (PCB).

19. The article of manufacture of claim 17, further comprising:
one or more electronic components, comprising:
  a corrodible material; and
  at least one silicone material.

20. The article of manufacture of claim 19, wherein at least one of the one or more electronic components is a resistor.

* * * * *